(12) United States Patent
Nigam et al.

(10) Patent No.: US 10,455,041 B2
(45) Date of Patent: Oct. 22, 2019

(54) STATEFUL SERVICE WITH PARTIAL REPLICATION

(71) Applicant: Rovio Entertainment Ltd., Espoo (FI)

(72) Inventors: Ankit Nigam, Espoo (FI); Petri Seppänen, Espoo (FI); Kai Cao, Espoo (FI); Antti Virtanen, Helsinki (FI)

(73) Assignee: ROVIO ENTERTAINMENT, Espoo (FI)

( * ) Notice: Subject to any disclaimer, the term of this patent is extended or adjusted under 35 U.S.C. 154(b) by 430 days.

(21) Appl. No.: 14/184,738

(22) Filed: Feb. 20, 2014

(65) Prior Publication Data

US 2015/0237121 A1    Aug. 20, 2015

(51) Int. Cl.
| | | |
|---|---|---|
| H04L 29/06 | (2006.01) | |
| H04L 29/08 | (2006.01) | |
| G06F 9/50 | (2006.01) | |
| G06F 9/48 | (2006.01) | |

(52) U.S. Cl.
CPC ...... *H04L 67/2814* (2013.01); *H04L 67/1008* (2013.01); *G06F 9/4856* (2013.01); *G06F 9/5083* (2013.01); *G06F 9/5088* (2013.01); *H04L 67/1002* (2013.01); *H04L 67/14* (2013.01)

(58) Field of Classification Search
CPC .... G06F 9/5088; G06F 9/5083; G06F 9/4856; G06F 11/1433; G06F 9/546; G06F 11/1438; G06F 9/45558; H04L 67/1002; H04L 67/2814; H04L 67/1008; H04L 67/14

See application file for complete search history.

(56) References Cited

U.S. PATENT DOCUMENTS

| | | | | |
|---|---|---|---|---|
| 5,907,485 | A * | 5/1999 | Van Loo ............... | G06F 13/24 700/3 |
| 8,898,520 | B1 * | 11/2014 | Ford ..................... | G06F 9/546 714/15 |
| 9,319,267 | B1 * | 4/2016 | Buchko ............. | H04L 41/0663 |
| 9,426,115 | B1 * | 8/2016 | Pauls .................... | H04L 51/14 |
| 2002/0091814 | A1 * | 7/2002 | Arendt ................ | G06F 9/5061 709/223 |
| 2004/0185936 | A1 * | 9/2004 | Block .................. | G07F 17/32 463/42 |
| 2006/0059228 | A1 | 3/2006 | Kasamsetty et al. | |

(Continued)

FOREIGN PATENT DOCUMENTS

| | | |
|---|---|---|
| EP | 0540151 A2 | 5/1993 |
| WO | WO2007027679 A2 | 3/2007 |

*Primary Examiner* — Dhairya A Patel
*Assistant Examiner* — Clifton Houston
(74) *Attorney, Agent, or Firm* — Squire Patton Boggs (US) LLP

(57) ABSTRACT

According to an example embodiment of the present invention, there is provided an apparatus comprising at least one processing core, at least one memory including computer program code, the at least one memory and the computer program code being configured to, with the at least one processing core, cause the apparatus at least to cause at least one first node to be provided with software and initialized with data, cause the at least one first node to be set to a slave mode, cause a load balancer to be updated with information concerning the at least one first node, and terminate at least one second node, and in connection with terminating the at least one second node, set the at least one first node to an active mode.

10 Claims, 5 Drawing Sheets

(56) References Cited

U.S. PATENT DOCUMENTS

| | | | |
|---|---|---|---|
| 2006/0063590 A1* | 3/2006 | Abassi | A63F 13/12 463/29 |
| 2007/0174660 A1* | 7/2007 | Peddada | H04L 41/0663 714/4.1 |
| 2008/0082652 A1* | 4/2008 | Gates | H04L 67/20 709/224 |
| 2008/0127200 A1* | 5/2008 | Richards | G06F 11/3664 718/106 |
| 2009/0138751 A1* | 5/2009 | Moore | G06F 11/0709 714/4.1 |
| 2010/0095165 A1 | 4/2010 | Freund et al. | |
| 2010/0162036 A1* | 6/2010 | Linden | G06F 11/181 714/4.11 |
| 2010/0251262 A1* | 9/2010 | Rokicki | G06F 9/546 719/314 |
| 2010/0325190 A1* | 12/2010 | Riley | G06F 9/546 709/201 |
| 2011/0173622 A1 | 7/2011 | Shin et al. | |
| 2012/0017219 A1 | 1/2012 | Hsieh et al. | |
| 2012/0030335 A1* | 2/2012 | Machida | G06F 11/1438 709/223 |
| 2012/0054771 A1 | 3/2012 | Krishnamurthy et al. | |
| 2012/0109919 A1* | 5/2012 | Park | G06F 11/2023 707/703 |
| 2012/0110063 A1* | 5/2012 | Prasad | G06Q 10/06 709/203 |
| 2012/0117241 A1* | 5/2012 | Witt | H04L 67/00 709/226 |
| 2012/0195187 A1* | 8/2012 | Ashihara | G06F 9/46 370/220 |
| 2012/0198004 A1* | 8/2012 | Watte | H04L 51/043 709/206 |
| 2012/0317274 A1* | 12/2012 | Richter | G06Q 10/06 709/224 |
| 2013/0054670 A1* | 2/2013 | Keyes | G06F 19/3481 709/201 |
| 2013/0262678 A1* | 10/2013 | Tung | G06F 9/5072 709/226 |
| 2014/0047116 A1* | 2/2014 | Dain | G06F 9/5061 709/226 |
| 2014/0059310 A1* | 2/2014 | Du | G06F 3/065 711/162 |
| 2015/0039764 A1* | 2/2015 | Beloglazov | H04L 47/70 709/226 |

* cited by examiner

STATEFUL SERVICE WITH PARTIAL REPLICATION

FIELD OF INVENTION

The invention relates to the field of managing virtual or non-virtual computer nodes.

BACKGROUND OF INVENTION

Computer networks comprise pluralities of computer nodes, or nodes. Computer nodes may each be furnished with processing and storage capability. Where a node is non-virtual it may comprise at least one processor, where a node is virtual, or logical, it may have access to a physical processing resource, such as for example at least one processor. Where a node is non-virtual it may comprise memory, where a node is virtual, or logical, it may have access to a physical memory resource, such as for example RAM memory and/or magnetic storage media.

Computer networks comprise, in addition to computer nodes, connections between computer nodes comprised in the computer network. Such connections may be wire-line or at least in part wireless. Wired connections may comprise Ethernet or universal serial bus, USB, connections, for example, and wireless connections may comprise wireless local area network, WLAN, or Bluetooth connections, for example.

Connections between nodes define a topology of the network. A network topology may be arranged to enable the network to fulfil its purpose. Some networks use a star topology where nodes exclusively or predominantly have connections to a central node. Some networks use a ring topology where nodes are arranged with connections to two other nodes, the connections overall arranging the nodes into a ring. Other networks are unstructured or comprise a mix of elements adhering to different topologies. For example, a peer-to-peer network may comprise unstructured connections between peers and central controller nodes, which are connected to a large number or peer nodes.

A distributed computing network comprises nodes that communicate with each other and coordinate their actions to collectively process information. The nodes may interact with each other to achieve a common coal, wherein such coordination and interaction may comprise passing messages between nodes, for example via at least one message queue. A distributed network may perform processing concurrently in different nodes to accomplish a goal.

A distributed hash table, DHT, is a decentralized type of distributed computing network. In a DHT, information may be stored based on a key, which may comprise, for example, a subscriber identity. The key may be hashed using a hash function to determine a node participating in the DHT that is to serve the subscriber. Each DHT node may be configured to serve a range of values in a space spanned by output of the hash function. Specific types of DHT include Kademlia and Chord.

SUMMARY OF THE INVENTION

According to a first aspect of the present invention, there is provided an apparatus comprising at least one processing core, at least one memory including computer program code, the at least one memory and the computer program code being configured to, with the at least one processing core, cause the apparatus at least to cause at least one first node to be provided with software and initialized with data, cause the at least one first node to be set to a slave mode, cause a load balancer to be updated with information concerning the at least one first node, and terminate at least one second node, and in connection with terminating the at least one second node, set the at least one first node to an active mode.

In various embodiments in accordance with the first aspect, there may be comprised therein at least one feature from the following bulleted list:

the slave mode comprises that a node in the slave mode subscribes to a slave message queue the data comprises data from the at least one second node at least one of the at least one first node and the at least one second node comprises a virtual node the at least one memory and the computer program code are configured to, with the at least one processing core, further cause the apparatus to cause the at least one second node to be set to a standby mode before terminating the at least one second node the software provided to the at least one first node comprises an updated version of software running in the at least one second node the apparatus is not configured to participate in or cause continuous replication of actors between nodes the standby mode comprises that a node in the standby mode subscribes to a master message queue.

According to a second aspect of the present invention, there is provided a method, comprising causing at least one first node to be provided with software and initialized with data, causing the at least one first node to be set to a slave mode, causing a load balancer to be updated with information concerning the at least one first node, and terminating at least one second node, and in connection with terminating the at least one second node, setting the at least one first node to an active mode.

In various embodiments in accordance with the second aspect, there may be comprised therein at least one feature from the preceding bulleted list laid out in connection with the first aspect.

According to a third aspect of the present invention, there is provided an apparatus comprising at least one processing core, at least one memory including computer program code, the at least one memory and the computer program code being configured to, with the at least one processing core, cause the apparatus at least to receive messages to a message queue from transmitter nodes comprised in a plurality of nodes, and forward at least some of the messages, at least in part, from the message queue to receiver nodes comprised in the plurality of nodes, and cause history data of the messages to be compiled by causing the messages to be retained, at least in part, after the forwarding.

In various embodiments in accordance with the third aspect, there may be comprised therein at least one feature from the following bulleted list:

the at least one memory and the computer program code are configured to, with the at least one processing core, cause the apparatus to refrain from forwarding a first message from the message queue responsive to an indicator comprised in the first message the at least one memory and the computer program code are configured to, with the at least one processing core, cause the apparatus to receive a second message from a first one of the transmitter nodes, and to forward the second message to a first one of the receiver nodes, the first one of the transmitter nodes being the same node as the first one of the receiver nodes.

According to a fourth aspect of the present invention, there is provided a method, comprising receiving messages to a message queue from transmitter nodes comprised in a plurality of nodes, and forwarding at least some of the messages, at least in part, from the message queue to receiver nodes comprised in the plurality of nodes, and causing history data of the messages to be compiled by causing the messages to be retained, at least in part, after the forwarding.

In various embodiments in accordance with the fourth aspect, there may be comprised therein at least one feature from the preceding bulleted list laid out in connection with the third aspect.

According to a fifth aspect of the present invention, there is provided an apparatus comprising means for causing at least one first node to be provided with software and initialized with data, means for causing the at least one first node to be set to a slave mode, means for causing a load balancer to be updated with information concerning the at least one first node, means for terminating at least one second node, and means for setting the at least one first node to an active mode in connection with terminating the at least one second node.

According to a sixth aspect of the present invention, there is provided an apparatus, comprising means for receiving messages to a message queue from transmitter nodes comprised in a plurality of nodes, and for forwarding at least some of the messages, at least in part, from the message queue to receiver nodes comprised in the plurality of nodes, and means for compiling history data of the messages by causing the messages to be retained, at least in part, after the forwarding.

According to a seventh aspect of the present invention, there is provided a non-transitory computer readable medium having stored thereon a set of computer readable instructions that, when executed by at least one processor, cause at least: causing at least one first node to be provided with software and initialized with data, causing the at least one first node to be set to a slave mode, causing a load balancer to be updated with information concerning the at least one first node, and terminating at least one second node, and in connection with terminating the at least one second node, setting the at least one first node to an active mode.

According to a eighth aspect of the present invention, there is provided a non-transitory computer readable medium having stored thereon a set of computer readable instructions that, when executed by at least one processor, cause at least receiving messages to a message queue from transmitter nodes comprised in a plurality of nodes, and forwarding at least some of the messages, at least in part, from the message queue to receiver nodes comprised in the plurality of nodes, and compiling history data of the messages by causing the messages to be retained, at least in part, after the forwarding.

INDUSTRIAL APPLICABILITY

At least some embodiments of the present invention find application in implementing communication networks with partial replication of node data.

DETAILED DESCRIPTION OF EXAMPLE EMBODIMENTS

When implementing a distributed computing or communication system, continuous node replication performed to provide seamless service continuity in case of node failure increases the complexity and cost of the system. At least some embodiments of the present invention may provide for simplified computing or communication systems by replicating only part of node data, for example messages in a message queue. At least some embodiments of the present invention may also or alternatively provide a seamless node updating procedure that avoids service discontinuity from the point of view of users.

Figure 1:
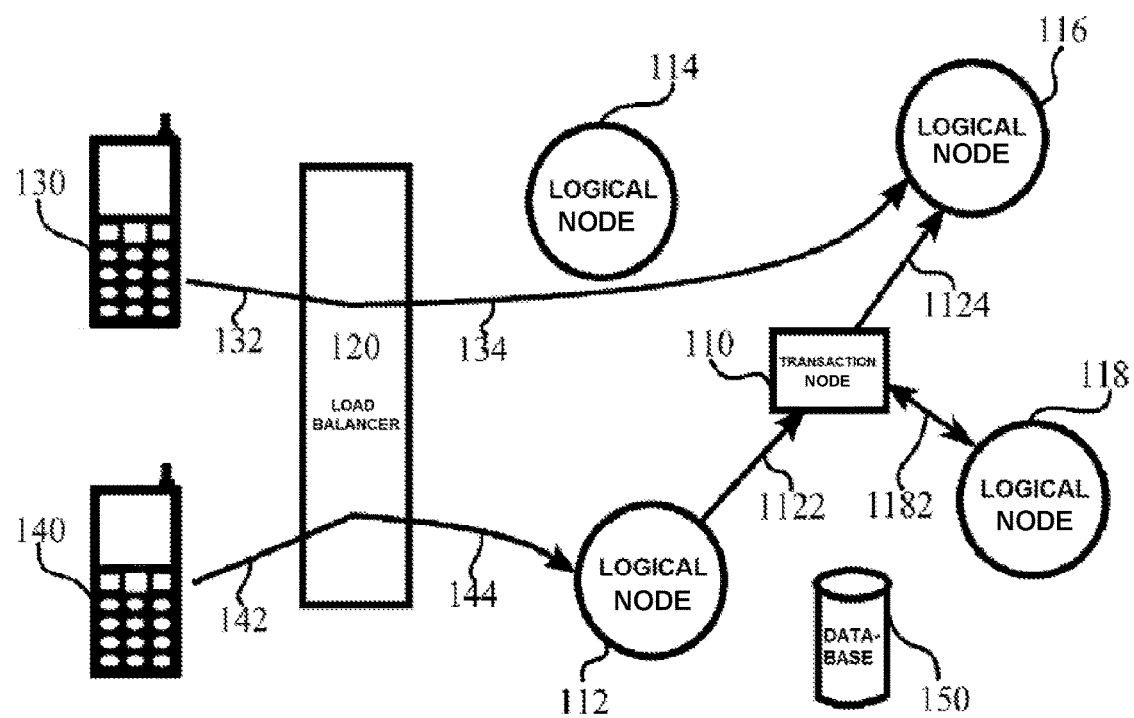
FIG. 1 illustrates an example system capable of supporting at least some embodiments of the invention.

FIG. 1 illustrates an example system capable of supporting at least some embodiments of the invention. Illustrated are clients 130 and 140, which may comprise, for example, computing apparatuses such as mobile phones, smartphones, tablet devices, laptop computers or desktop computers. Clients 130 and 140 need not be devices of the same type.

Load balancer 120 is disposed logically between the clients and a distributed system comprising logical nodes 112, 114, 116, 118 and transaction node 110. Being disposed logically between may comprise that the clients contact the logical nodes via load balancer 120, at least initially. A client and load balancer 120 may be in communication with each other either directly or indirectly, wherein indirect communication may comprise communication via at least one intermediate node or network. Each logical node 112, 114, 116 and 118 may be hosted in a separate physical node, or alternatively at least two of the logical nodes may be hosted in a same physical node. A logical node may comprise its own connectivity information, such as for example an IP address, or IP address and port. The connectivity information may enable the logical node to be addressed. A logical node may comprise storage resources and/or processing resources. Storage resources may comprise, for example, a share of a hard drive or other storage medium. Processing resources may comprise, for example, a timeshare of at least one processing core. The distributed system may operate as a DHT, for example. In some embodiments, all logical nodes are hosted in the same physical node. A physical node hosting at least one logical node may comprise, for example, a laptop computer, a desktop computer, a server, computing cluster, minicomputer or a supercomputer. Logical nodes will be referred to as nodes hereinafter.

Clients 130 and 140 may communicate with the distributed system via load balancer 120 using hypertext transfer protocol, HTTP, for example. To reach the distributed system, client 130 may transmit a message, for example a HTTP message, to load balancer 120. Such a message is illustrated as 132 in FIG. 1. Message 132 may comprise an identifier of client 130, such as for example a subscriber identity, phone number, international mobile station equipment identity, IMEI, or other identifier. An identifier of a client may act as a hash function input in load balancer 120, or load balancer 120 may be configured to use a different variable as a hash function input. An identifier of client 130 may relate to a specific first application client 130 is running or accessing.

Responsive to receiving message 132, load balancer 120 may derive a node key using a hash function. In detail, load balancer 120 may provide a hash function input to a hash function, such as for example a rolling hash function or cryptographic hash function. A node key may then be derived by load balancer 120 by applying an output of the hash function to a mapping between hash function outputs and node keys. A node key corresponding to the output of the hash function may thus be derived, the node key comprising information identifying a node from among nodes comprised in the distributed system, in the illustrated example one of nodes 112, 114, 116 and 118. In some embodiments, the output of the hash function may be the node key, or may comprise the node key. For example, a node key may be a value comprised in node key space. For example, where node key space is [0, 1000], node 112 may be responsible for values [0, 250], node 114 may be responsible for values [251, 400], node 116 may be responsible for values [401, 800] and node 118 may be responsible for values [801, 1000]. A node key 431 would therefore refer to node 116.

The node key may be provided from load balancer 120 to client 130, and/or message 132 may be forwarded from load balancer 120 to the node identified by the node key. In case the node key is provided to client 130, client 130 may responsively use it to transmit a message to the node identified in the node key. In the illustrated example, the node identified by the node key is node 116. Message 134 may be either message 132 forwarded from node balancer 120 or a message sent from client 130 using the node key provided by load balancer 120. Alternatively or additionally to providing the node key itself, load balancer 120 may provide the client with an IP address and/or port number of the node referred to by the node key.

Message 134 may be addressed to node 116 by a combination of internet protocol, IP, address and port number. The IP address may conform to IPv4 or IPv6 addressing. Where the IP address conforms to IP6v addressing, port number may be absent as each actor may have its own IPv6 address.

Responsive to receiving message 134, node 116 may initiate an actor in node 116 to serve client 130. The actor may be a process, group of processes or environment running on computational and/or storage resources of node 116. The actor may provide service to client 130, such as for example storage of files, receiving of messages on behalf of client 130, or storage and/or communication of game data for client 130. Messages received on behalf of client 130 may be received from other actors in the distributed system or from other nodes.

When client 130 subsequently contacts node 116, it may be served by the same actor already in existence. In some embodiments, an actor may be configured to serve two distinct clients, for example where the actor is configured to facilitate playing a game or chat service. The two clients served by the same actor may be accounts of the same user, who has logged on to a service on more than one device. Alternatively, in case client 130 subsequently contacts node 116 in connection with operating a second application, different from the first application, a new actor may be initialized in node 116. In some embodiments, client 130 may have a different identifier of client 130 relating to the second application, in which case client 130 may be directed by load balancer 120 to a another node in the distributed system. A new actor may then be initiated in said another node.

Arranged in connection with the distributed system of FIG. 1 may, optionally, be database 150. Database 150 may be comprised in a node which hosts at least one of nodes 112, 114, 116, 118 and/or transaction node 110, or alternatively database 150 may be comprised in a different node. Database 150 may be configured to store replicas of data, such as actors, of at least one, and in some embodiments each of, nodes 112, 114, 116 and 118. Database 150 may itself be replicated. Database 150 is operably connected to the nodes it receives data from for storing, such connections are not illustrated in FIG. 1 for the sake of clarity. Database 150 may be distinct from nodes 112, 114, 116 and 118 of the distributed system in the sense that it does not participate in exchanging messages between actors and/or in the sense that it does not accept messages from clients.

In the event of failure of one or more of nodes 112, 114, 116 and 118, the distributed system of FIG. 1 may be configured to dynamically re-generate a replacement node, for example in the same or a different physical node as hosted the failed node. The replacement node may be populated with data from database 150 to restore functionality of actors that were present in the failed node. During initialization of the replacement node, clients 130 and 140 may experience temporary outage of service of their actors that were present in the failed node.

Initialization of a replacement node may be triggered by a watcher process of the distributed system, which may monitor nodes comprised in the distributed system for failure. Responsive to a timeout when waiting for a reply to a heartbeat message, for example, the watcher process may verify the node concerned has failed before triggering initialization of a replacement node. A verification that a node has failed may comprise transmission of a second heartbeat message, for example. In case no reply is received to the second heartbeat message either, the watcher process may be configured to conclude the node has failed. In some embodiments, a watcher may conclude already based on a single missing response to a heartbeat message that a node has failed. A watcher process may be hosted in the physical node hosting transaction node 110, for example. A heartbeat message may comprise a message configured to elicit a response from a node. A watcher process may send heartbeat messages periodically, for example, to monitor that nodes have not failed. A failed node would not transmit a response to a heartbeat message.

Alternatively to initializing a replacement node, the distributed system may be configured to re-distribute actors present in a failed node, or a node removed from the system for another reason, to remaining nodes. Such re-distribution, which may be referred to as downscaling, may comprise also an update of the mapping between hash function outputs and node keys, or node keys and nodes, to enable smooth operation of the distributed system with a new set of nodes.

Re-distribution of actors and/or ranges in node key space may also occur in case a new node is added to the distributed system. For example, in case a watcher process determines that nodes comprised in the distributed system are working close to their capacity, the watcher process may trigger initialization of a new node. Once the new node is initialized, a re-distribution of actors and/or ranges in node key space may be performed to allocate some actors and node key space to the new node, and to reduce the number of actors in some, or indeed all, of the originally active nodes. For example, if before the addition of the new node each node in a four-node system hosted roughly 100 actors, adding a new, fifth, node may result in each node hosting roughly 80 actors.

A node may be configurable to at least one of the following states: INITIALIZING: Service starting, message queues are not connected, requests are not processed. INITIALIZED: Service starting finished. STARTING: Message queues are being drained from a message queue. STARTED: Message queue draining is finished. RUNNING: Normal operation state. RUNNING_SLAVE: Normal operation state in slave-mode, for example in case a secondary, slave, message queue is used. STANDBY: Message queues are not committed. Actors are not stopped nor persisted unless, in some embodiments, stopping is caused by memory pressure. In STANDBY mode actors may be in existence and have not been stopped, but they may be configured to not participate in exchanging messages either as message receivers nor message transmitters. Such actors may be used as back-up actors if needed and may be configured to RUNNING mode if desired. REBALANCING: Message queues are not committed. Actors are not stopped nor persisted unless, in some embodiments, stopping is caused by memory pressure.

In the following, example procedures relating to distributed systems, which may be employed in at least some systems operating in accordance with at least some embodiments of the present invention, are described using bulleted lists.

In the following first bulleted list, a process is described wherein a distributed system comprising six nodes N1, N2, N3, N4, N5, and N6 is scaled down to a 4-node system N1, N2, N3, and N4, wherein nodes N5, N6 are downscaled, or removed. The bulleted actions are performed in order from top to bottom:

Set nodes N5 and N6 to a STANDBY state
Set N1, N2, N3 and N4 to a REBALANCING state
Inform N1, N2, N3 and N4 of a new system configuration: (N1, N2, N3, N4)
Wait for N1, N2, N3 and N4 to get into STANDBY state.
Inform the load-balancer of the updated system configuration: (N1, N2, N3, N4) (Cut down traffic to downscales nodes before killing the nodes)
Terminate nodes: N5, N6
Set N1, N2, N3 and N4 nodes to RUNNING state In the following second bulleted list, a process is described wherein a distributed system comprising four nodes N1, N2, N3, and N4 is scaled up with 2 new nodes, U5 and U6. The bulleted actions are performed in order from top to bottom:

Setup new nodes: U5, U6
Wait for new nodes to get to INITIALIZED state: U5, U6
Inform new nodes of an updated view of the cluster
Set new nodes to STARTING state: U5, U6
Wait for new nodes to get into STARTED state: U5, U6
Set all nodes to REBALANCING state
Tell all nodes updated view of the cluster: N1, N2, N3, N4, U5, and U6
Tell load-balancer updated view of the cluster
Wait for all nodes to get into STANDBY state
Set all nodes to RUNNING state with "run" action.

In the following third bulleted list, a process is described wherein a distributed system updates software in at least one node comprised in the distributed system. Updating may be performed, for example, in batches of a few nodes at a time to reduce the needed re-balancing of actors. In this example, updating is performed in a system comprising four nodes, N1, N2, N3 and N4. The bulleted actions are performed in order from top to bottom:

Select batch size, for example 50% of nodes: N1, N2
Setup batch size of nodes with updated software: N5, N6
Wait for new nodes to get to INITIALIZED state: N5, N6
Set nodes to be replaced to STANDBY state: N1, N2
Inform new nodes of the updated view of the cluster: N3, N4, N5 and N6
Set new nodes to STARTING state N5, N6
Wait for new nodes to get into STARTED state: N5, N6
Set new nodes to RUNNING_SLAVE state with "run-slave" action: N5, N6
Inform load-balancer of updated view of the cluster
Inform rest of the nodes of updated view of the cluster
Kill replaced nodes: N1, N2
Set new nodes to RUNNING state with "run" action: N5, N6
Repeat from the first bullet for next batch In some embodiments, actors relating to a same application may be allocated to a same node, or a subset of nodes within the set of nodes of the distributed system. In some embodiments, such a subset is formed of nodes hosted in a single physical node. This may be beneficial since actors of different subscribers that work with a same application may end up communicating with each other.

Responsive to receiving a message from a client, the message pertaining to an actor present in another node of the distributed system, a node may respond to the client with a message comprising an indication of the correct node that does host the actor the client attempts to interact with. The message from the node may comprise, for example, an IP address, or IP address and port, of the node hosting the actor the client attempts to interact with. A client may contact an incorrect node, for example, in case actors have been re-distributed due to reorganization of the distributed system. To enable this, all nodes of the distributed system may store or have access to a list of actors and information identifying a node hosting each actor. A list of actors and information identifying a node hosting each actor may comprise, for example, a look-up table defining a mapping from a set of actors to a set of nodes. The mapping may associate each actor with exactly one node.

Transaction node 110 implements a message queue. Transaction node 110 may be hosted on a same physical node as at least one of nodes 112, 114, 116 and 118, or it may be hosted on a separate node. Transaction node 110 may have fast connectivity to nodes 112, 114, 116 and 118. Fast connectivity may comprise at least one of gigabit bandwidth and low latency, for example latency below 100 milliseconds. Transaction node 110 may be a message-oriented middleware node. The message queue may comprise master and slave queues, wherein messages directed to a node are placed in both the master queue and the slave queue. A node in RUNNING or STANDBY state may subscribe to the master queue. A node in STARTED, STARTING or RUNNING_SLAVE modes may subscribe to the slave queue. A node may be configured to only acknowledge messages when in a RUNNING state. Acknowledgements may be transmitted to both master and slave queues. Subscribing to a queue may comprise that a node requests for messages from that queue to be transmitted to itself. Master and slave queues may be similar to each other. Having master and slave queues may provide for the opportunity to allow nodes to subscribe to different queues. In some embodiments, exactly one physical node may be bound to a given master or slave queue.

When actors in nodes comprised in the distributed system illustrated in FIG. 1 exchange information, they may exchange the information in messages. A message that may be exchanged between actors may be in any suitable format that conveys information between actors. Such messages may be routed via transaction node 110 regardless of where the transmitting actor and receiving actor are running. In other words, even in case two actors running in the same node exchange information, the information may be exchanged in messages routed via transaction node 110. Also in case the actors are running in different nodes, the messages may be routed via transaction node 110.

Messaging between an actor residing in node 112 and an actor residing in node 116 is illustrated by messages 1122 and 1124 in FIG. 1. Node 112 transmits a message 1122 to transition node 110, which may place the incoming message to its message queue, for example in duplicated master and slave queues. Transaction node 110 subsequently transmits a message 1124, comprising at least in part, and possibly in whole, the information of message 1122, to node 116 when message 1122 reaches the end the master and/or slave message queue in transaction node 110. Transaction node 110 may be configured to cause a record copy of message 1122 to be stored, to compile history data.

Storing messages in a message queue may be beneficial, for example, in case of node failure and replacement node initialization. Messages arriving for the failed node may be retained in the message queue, and the replacement node may download them once the replacement node is up and running. This provides for limited redundancy in terms of application or actor state in distributed systems where actual node data is not duplicated. Depending on applications, this kind of redundancy may be sufficient to provide an acceptable level of service, in which case duplicating entire node data may be dispensed with as unnecessary.

Messaging between two actors residing in node 118 is illustrated by two-way arrow 1182. A message may be sent to transaction node 110 even though the actor endpoints of the communication reside in the same node, to enable transaction node 110 to compile the history data. In addition to messages 1182, node 118 may provide direct communication between the actors engaged in communication 1182 to decrease latency of the system. In this case, message 1182 sent to transaction node 110 may comprise an indicator indicating that return of the message back to node 118 is unnecessary, as node 118 intends to route the message between the actor endpoints internally in node 118.

In general in some embodiments, when two actors residing in a same node, or in a same physical node, communicate with each other the messages comprised in such communication are routed between the actors internally in the node or physical node concerned. In these cases, copies of the messages may nonetheless be sent via transaction node 110 for recordation in the history data. Such copies of the messages may be furnished with an indicator informing transaction node 110 that the message need not be routed back to the node. Alternatively, the node or physical node may be configured to discard the copy of the message it receives back from transaction node 110. In other embodiments, messages between actors are always routed via transaction node 110 and are not conveyed from actor to actor internally in a node or physical node.

Transaction node 110 may be configured to retain, at least in part, messages it routes to and from nodes 112, 114, 116 and 118 to form history data. Retaining in part may comprise retaining only certain kinds of messages and/or retaining only part of the contents of messages. For example, where messages are acknowledged, transaction node 110 may be configured to cause messages with substantial content to be retained, and furnished with an acknowledgement timestamp in connection with receiving or forwarding an acknowledgement. In such a case, the acknowledgement message as such may be omitted from the history data but the acknowledgement timestamp may indicate when a certain message with substantial content was acknowledged. In some embodiments, acknowledgement information may be omitted from history data altogether, or only data that has been acknowledged is included in the history data.

History data transaction node 110 causes to be compiled may be stored on a memory of a node hosting transaction node 110, and/or transaction node 110 may cause the history data to be stored in a node external to the node hosting transaction node 110. For example, transaction node 110 may be configured to, in connection with forwarding a message to one of nodes 112, 114, 116 and 118, forward a record copy of the message to the external node storing the history data. An example of an external node suitable for storing the history data is database 150. Where only acknowledged data is included in history data, transaction node 110 may be configured to retain messages in a buffer until they are acknowledged, and then upon acknowledgement forward the record copy of the message to the external node storing the history data, for example.

Figure 2:
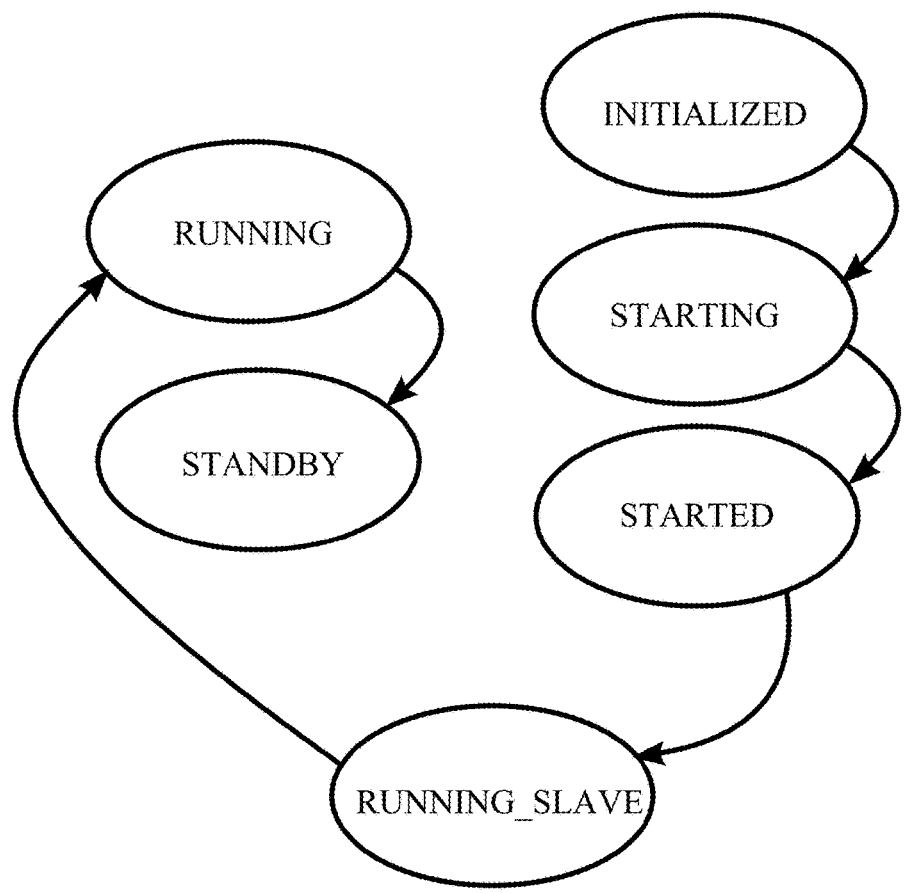
FIG. 2 is a state diagram illustrating state transitions in accordance with at least some embodiments of the present invention.

FIG. 2 is a state diagram illustrating state transitions in accordance with at least some embodiments of the present invention. FIG. 2 may be described in terms of a redeployment, such as for example an updating of software in nodes. Updating may comprise initiating new nodes with data from existing nodes, the new nodes being furnished with updated software. The existing nodes may be run down as a result of the updating procedure, and their functioning continued in the newly initiated nodes.

Initially, the new nodes may be instructed to transition to an INITIALIZED state. Once they have reached this state, existing nodes, which have been in a RUNNING state, may be instructed to transition to a STANDBY state, wherein actors in these nodes may continue to work. The new nodes may be instructed to transition to a STARTED state, which may occur via a STARTING state. In a STARTING state, message queues may be drained from a queue, and a transition to STARTED state may occur once such queues have been drained, for example.

Once the new nodes reach the STARTED state, they may be instructed to transition to a RUNNING_SLAVE state, wherein the nodes may operate normally in slave mode, wherein they may subscribe to a slave message queue in a duplicated message queue system. From the RUNNING_SLAVE mode the new nodes may be caused to transition to the RUNNING state, where they may subscribe to a master message queue in a duplicated message queue. The old nodes, running old software, may be terminated, or killed, from the STANDBY mode.

Figure 3:
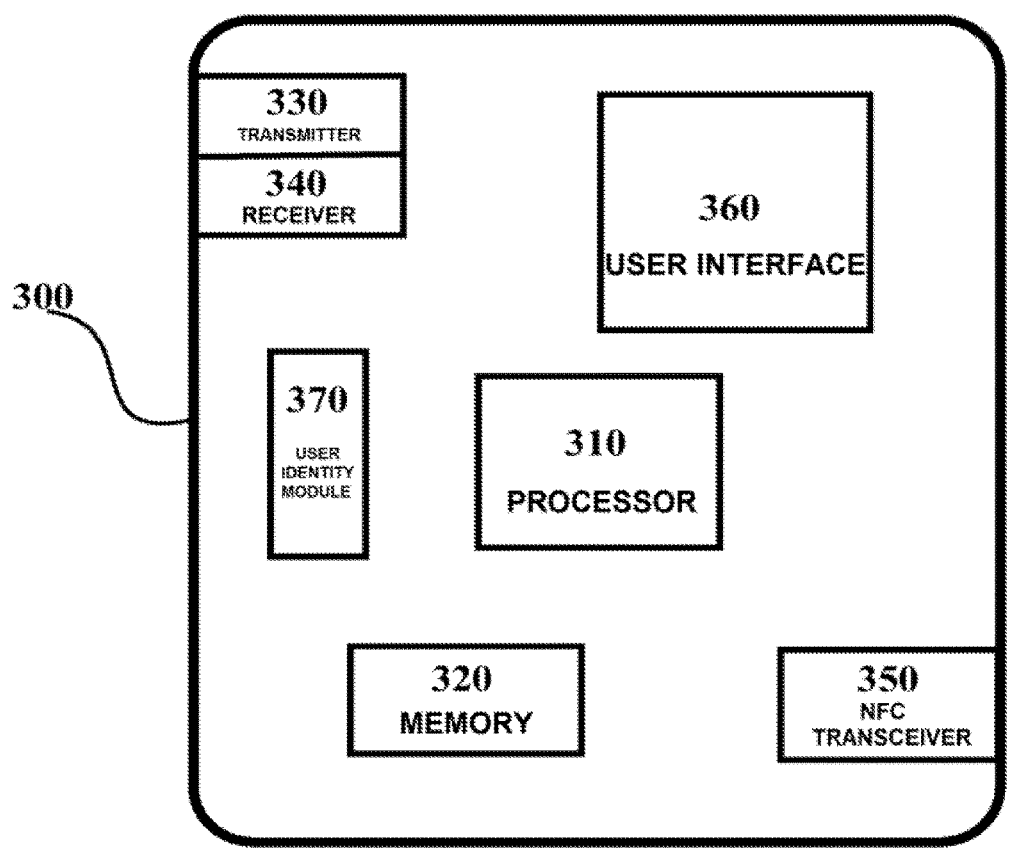
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a client device such as client 130, a device running a node such as node 116, or a device running transaction node 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300.

Device 300 may comprise memory 320. Memory 320 may comprise random-access memory and/or permanent memory. Memory 320 may comprise at least one RAM chip. Memory 320 may comprise magnetic, optical and/or holographic memory. Memory 320 may be at least in part accessible to processor 310. Memory 320 may comprise computer instructions that processor 310 is configured to execute.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300. Device 300 may comprise or be arranged to accept a user identity module where device 300 comprises a mobile device acting as a client, for example. A user identity module may facilitate wireless communication of device 300 using a cellular technology.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
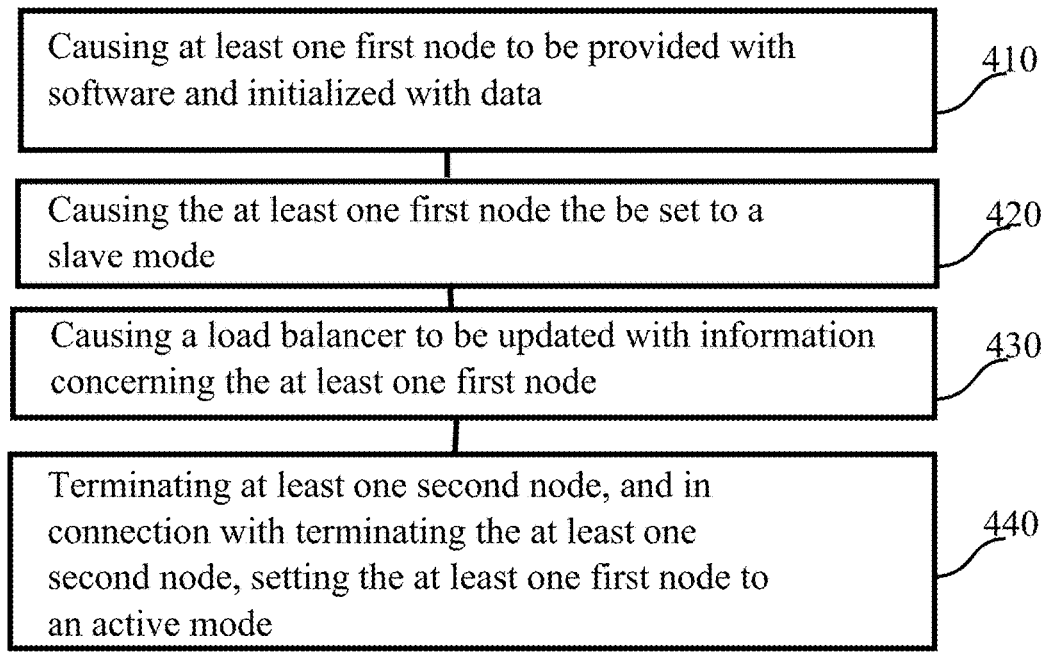
FIG. 4 is a first flow graph of a first method in accordance with at least some embodiments of the present invention.

FIG. 4 is a flow graph of a first method in accordance with at least some embodiments of the present invention. The phases of the illustrated method may be performed in a physical node hosting a control task or control thread of a distributed system, for example. Phase 410 comprises causing at least one first node to be provided with software and initialized with data. Phase 420 comprises causing the at least one first node to be set to a slave mode. Phase 430 comprises causing a load balancer to be updated with information concerning the at least one first node. Finally, phase 440 comprises terminating at least one second node, and in connection with terminating the at least one second node, setting the at least one first node to an active mode.

Figure 5:
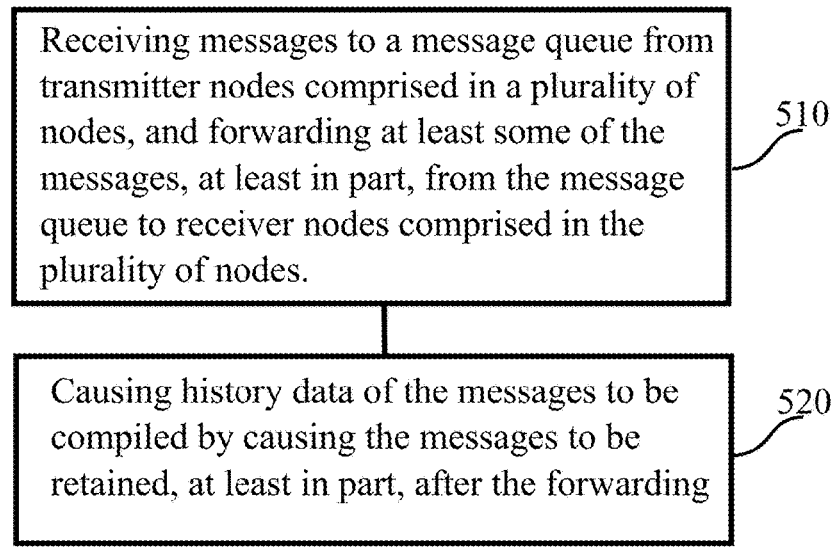
FIG. 5 is a second flow graph of a second method in accordance with at least some embodiments of the present invention.

FIG. 5 is a flow graph of a second method in accordance with at least some embodiments of the present invention. The phases of the illustrated method may be performed in transaction node 110, for example. Phase 510 comprises receiving messages to a message queue from transmitter nodes comprised in a plurality of nodes, and forwarding at least some of the messages, at least in part, from the message queue to receiver nodes comprised in the plurality of nodes. Phase 520 comprises causing history data of the messages to be compiled by causing the messages to be retained, at least in part, after the forwarding.

In general there is provided an apparatus comprising at least one processing core, at least one memory including computer program code, the at least one memory and the computer program code being configured to, with the at least one processing core, cause the apparatus at least to cause at least one first node to be provided with software and initialized with data, cause the at least one first node to be set to a slave mode, cause a load balancer to be updated with information concerning the at least one first node, terminate at least one second node, and in connection with terminating the at least one second node, set the at least one first node to an active mode. The slave mode may be a RUNNING_SLAVE mode, for example. Setting the at least one first node to an active mode in connection with terminating the at least one second node may comprise setting the at least one first node to the active mode responsive to the terminating, shortly preceding the terminating or shortly after the terminating. Causing the load balancer to be updated with information concerning the at least one first node may comprise causing the load balancer to start directing at least part of incoming traffic to the at least one first node. Data may comprise at least one actor. Information concerning the at least one first node may comprise, for example, a mapping between node keys and nodes. Software may comprise software configured to cause the node to operate as part of a distributed system.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising at least one processing core, at least one memory including computer program code, the at least one memory and the computer program code being configured to, with the at least one processing core, cause the apparatus at least to:

cause at least one first node to be provided with software and initialized with data, wherein the data is comprised within a message queue of at least one second node for duplicating in the at least first node any one of an application state or an actor state in the at least one second node, but not duplicating the at least one second node's entire data, wherein the message queue comprises a master message queue and a slave message queue that are similar to each other, and wherein the message queue comprises messages arriving at the at least one second node via a transaction node before the at least one second node is terminated, and wherein the messages are retained at the transaction node in the message queue in connection with forwarding the messages to the at least one second node;

cause the at least one second node to be set to a standby mode, wherein the at least one second node in the standby mode subscribes to the master message queue, and wherein the at least one second node in the standby mode does not send any acknowledgment messages;

cause the at least one first node to be set to a slave mode after being initialized with the data, wherein the at least one first node in the slave mode subscribes to the slave message queue, and wherein the at least one first node in the slave mode does not send any acknowledgement messages;

cause a load balancer to be updated with information concerning the at least one first node in the slave mode; and terminate the at least one second node, and set the at least one first node to an active mode after terminating the at least one second node, wherein the at least one second node in the active mode subscribes to the master message queue, and wherein the at least one second node in the active mode sends acknowledgment messages.

2. An apparatus according to claim 1, wherein the data comprises data from the at least one second node.

3. An apparatus according to claim 1, wherein at least one of the at least one first node and the at least one second node comprises a virtual node.

4. An apparatus according to claim 1, wherein the software provided to the at least one first node comprises an updated version of software running in the at least one second node.

5. A method, comprising:

causing at least one first node to be provided with software and initialized with data, wherein the data is comprised within a message queue for duplicating in the at least first node any one of an application state or an actor state in at least one second node, but not duplicating the at least one second node's entire data, wherein the message queue comprises a master message queue and a slave message queue that are similar to each other, wherein the message queue comprises messages arriving at the at least one second node via a transaction node before the at least one second node is terminated, and wherein the messages are retained at the transaction node in the message queue in connection with forwarding the messages to the at least one second node;

causing the at least one second node to be set to a standby mode, wherein the at least one second node in the standby mode subscribes to the master message queue, and wherein the at least one second node in the standby mode does not send any acknowledgment messages;

causing the at least one first node to be set to a slave mode after being initialized with the data, wherein the at least one first node in the slave mode subscribes to the slave message queue, and wherein the at least one first node in the slave mode does not send any acknowledgement messages;

causing a load balancer to be updated with information concerning the at least one first node in the slave mode; and terminating the at least one second node, and setting the at least one first node to an active mode after terminating the at least one second node, wherein the at least one second node in the active mode subscribes to the master message queue, and wherein the at least one second node in the active mode sends acknowledgment messages.

6. A method according to claim 5, wherein the data comprises data from the at least one second node.

7. A method according to claim 5, wherein at least one of the at least one first node and the at least one second node comprises a virtual node.

8. A method according to claim 5, wherein the software provided to the at least one first node comprises an updated version of software running in the at least one second node.

9. An apparatus, comprising:
means for causing at least one first node to be provided with software and initialized with data, wherein the data is comprised within a message queue for duplicating in the at least first node any one of an application state or an actor state in at least one second node, but not duplicating the at least one second node's entire data, wherein the message queue comprises a master message queue and a slave message queue that are similar to each other, wherein the message queue comprises messages arriving at the at least one second node via a transaction node before the at least one second node is terminated, and wherein the messages are retained at the transaction node in the message queue in connection with forwarding the messages to the at least one second node;

means for causing the at least one second node to be set to a standby mode, wherein the at least one second node in the standby mode subscribes to the master message queue, and wherein the at least one second node in the standby mode does not send any acknowledgment messages;

means for causing the at least one first node to be set to a slave mode after being initialized with the data, wherein the at least one first node in the slave mode subscribes to the slave message queue, and wherein the at least one first node in the slave mode does not send any acknowledgement messages;

means for causing a load balancer to be updated with information concerning the at least one first node in the slave mode;

means for terminating the at least one second node; and means for setting the at least one first node to an active mode after terminating the at least one second node, wherein the at least one second node in the active mode subscribes to the master message queue, and wherein the at least one second node in the active mode sends acknowledgment messages.

10. A non-transitory computer readable medium having stored thereon a set of computer readable instructions that, when executed by at least one processor, at least:

causes at least one first node to be provided with software and initialized with data, wherein the data is comprised within a message queue for duplicating in the at least first node any one of an application state or an actor state in at least one second node, but not duplicating the at least one second node's entire data, wherein the message queue comprises a master message queue and a slave message queue that are similar to each other, wherein the message queue comprises messages arriving at the at least one second node before the at least one second node via a transaction node is terminated, and wherein the messages in the message queue are retained at the transaction node in connection with forwarding the messages to the at least one second node;

causes the at least one second node to be set to a standby mode, wherein the at least one second node in the standby mode subscribes to the master message queue, and wherein the at least one second node in the standby mode does not send any acknowledgment messages;

causes the at least one first node to be set to a slave mode after being initialized with the data, wherein the at least one first node in the slave mode subscribes to the slave message queue, and wherein the at least one first node in the slave mode does not send any acknowledgement messages;

causes a load balancer to be updated with information concerning the at least one first node in the slave mode; and terminates at least one second node, and sets the at least one first node to an active mode after terminating the at least one second node, wherein the at least one second node in the active mode subscribes to the master message queue, and wherein the at least one second node in the active mode sends acknowledgment messages.

* * * * *